US012158349B2

(12) United States Patent
Geraghty et al.

(10) Patent No.: US 12,158,349 B2
(45) Date of Patent: Dec. 3, 2024

(54) VEHICULAR TRAFFIC FLOW OPTIMIZATION

(71) Applicant: AT&T Intellectual Property I, L.P., Atlanta, GA (US)

(72) Inventors: Timothy Geraghty, Morristown, NJ (US); Caroleen Chen, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 85 days.

(21) Appl. No.: 17/483,338

(22) Filed: Sep. 23, 2021

(65) Prior Publication Data

US 2023/0087109 A1 Mar. 23, 2023

(51) Int. Cl.
G08G 1/00 (2006.01)
G01C 21/34 (2006.01)
G08G 1/0968 (2006.01)

(52) U.S. Cl.
CPC ... *G01C 21/3461* (2013.01); *G08G 1/096805* (2013.01)

(58) Field of Classification Search
CPC .............. G01C 21/3461; G08G 1/096805
See application file for complete search history.

(56) References Cited

U.S. PATENT DOCUMENTS

| | | | |
|---|---|---|---|
| 5,272,638 A | 12/1993 | Martin et al. | |
| 6,216,086 B1 | 4/2001 | Seymour et al. | |
| 6,314,360 B1 | 11/2001 | Becker | |
| 6,490,519 B1 | 12/2002 | Lapidot et al. | |

(Continued)

FOREIGN PATENT DOCUMENTS

| | | |
|---|---|---|
| CN | 106197455 A | 12/2016 |
| DE | 102018008718 A1 | 5/2019 |
| JP | 2020177314 A | 10/2020 |

OTHER PUBLICATIONS

Cruz-Piris et al., "Automated Optimization of Intersections Using a Genetic Algorithm," IEEE Access ( vol. 7), Feb. 12, 2019, 17 pages.

(Continued)

*Primary Examiner* — Khoi H Tran
*Assistant Examiner* — Aaron G Cain
(74) *Attorney, Agent, or Firm* — Guntin & Gust, PLC; John G. Rauch

(57) ABSTRACT

An architecture to maximize vehicular traffic flow. A method comprises receiving from database equipment a key performance indicator value representing an aggregation of connections that exist between serving equipment situated in a first vicinity of a first area and a group of user equipment traveling through the first vicinity, based on the key performance indicator value, generating a density map for the first vicinity, overlaying the density map over a group of roadways associated with the first vicinity, based on a width value associated with a roadway of the group of roadways, a defined vehicular throughput value associated with the roadway, and a demand penalty value associated with the roadway, determining a maximum vehicular throughput for the group of roadways, and based on the maximum vehicular throughput, causing a user equipment to display a ranked list of routes between the first vicinity and a second vicinity of a second area.

20 Claims, 10 Drawing Sheets

(56) References Cited

U.S. PATENT DOCUMENTS

| | | | |
|---|---|---|---|
| 6,587,785 | B2 | 7/2003 | Jijina et al. |
| 6,594,576 | B2 | 7/2003 | Fan et al. |
| 6,950,745 | B2 | 9/2005 | Agnew et al. |
| 7,376,509 | B2 | 5/2008 | Endo et al. |
| 7,706,973 | B2 * | 4/2010 | McBride ............ G01C 21/3676 701/428 |
| 7,908,080 | B2 | 3/2011 | Rowley et al. |
| 8,214,142 | B2 | 7/2012 | Cerecke et al. |
| 8,249,810 | B2 | 8/2012 | Jones |
| 8,255,155 | B1 | 8/2012 | Crane et al. |
| 8,433,511 | B2 | 4/2013 | Heaps et al. |
| 9,448,081 | B2 | 9/2016 | Kuznetsov et al. |
| 9,459,106 | B2 | 10/2016 | König |
| 9,747,575 | B2 | 8/2017 | Jain et al. |
| 10,318,909 | B2 | 6/2019 | Byrne et al. |
| 10,775,182 | B2 | 9/2020 | Fu et al. |
| 11,600,166 | B1 * | 3/2023 | Trépanier ............ G08B 25/006 |
| 2005/0096840 | A1 | 5/2005 | Simske |
| 2005/0096842 | A1 | 5/2005 | Tashiro |
| 2019/0041225 | A1 | 2/2019 | Winkle et al. |
| 2019/0331502 | A1 | 10/2019 | Fowe |
| 2020/0033147 | A1 | 1/2020 | Ahn |
| 2021/0019376 | A1 * | 1/2021 | Neubauer ............ G08G 1/0129 |

OTHER PUBLICATIONS

Goudarzi et al., "Self-Organizing Traffic Flow Prediction with an Optimized Deep Belief Network for Internet of Vehicles," Sensors 2018, vol. 18, Issue No. 10, 18 pages.

Khoza et al., "Decreasing Traffic Congestion in VANETs Using an Improved Hybrid Ant Colony Optimization Algorithm," Journal of Communications vol. 15, No. 9, Sep. 2020, 11 pages.

Madani et al., "Genetic algorithm optimization for traffic cellular automata models with multiple-junctions," EEE, International Conference on Multimedia Computing and Systems, Ouarzzazate, Maroc, Apr. 7-8, 2011, 5 pages.

Shoufeng et al., "Based on Hybrid Genetic Algorithm and Cellular Automata Combined Traffic Signal Control and Route Guidance," Proceedings of the 26th Chinese Control Conference Jul. 26-31, 2007, 5 pages.

Wu et al., "Cellpath: fusion of cellular and traffic sensor data for route flow estimation via convex optimization," 21st International Symposium on Transportation and Traffic Theory, ISTTTT21 2015, Aug. 5-7, 2015, 21 pages.

Zhang et al., "Traffic Congestion Evaluation and Signal Control Optimization Based on Wireless Sensor Networks: Model and Algorithms," Mathematical Problems in Engineering, vol. 2012, Article ID 573171, 18 pages.

* cited by examiner

VEHICULAR TRAFFIC FLOW OPTIMIZATION

TECHNICAL FIELD

The disclosed subject matter relates to leveraging key performance indicators (KPIs) from network equipment and population density maps to optimize traffic patterns based on end users start locations, destinations, other pertinent data, shortest route by ground distance traveled, or quickest route.

BACKGROUND

Trends indicate there is a year over year increase in vehicular traffic on roads. With the current infrastructure constraints, by increasing the number of vehicles on the road, there will be an increased amount of congestion. Without adding new infrastructure and modifying environments, this becomes problematic. Currently, popular solutions, such as global positioning satellite (GPS) navigation applications operational on smartphones and tablet computers, provide turn-by-turn navigation information, and utilize the speed of application end users and determine whether traffic exists and redirect if needed.

DETAILED DESCRIPTION

Figure 1:
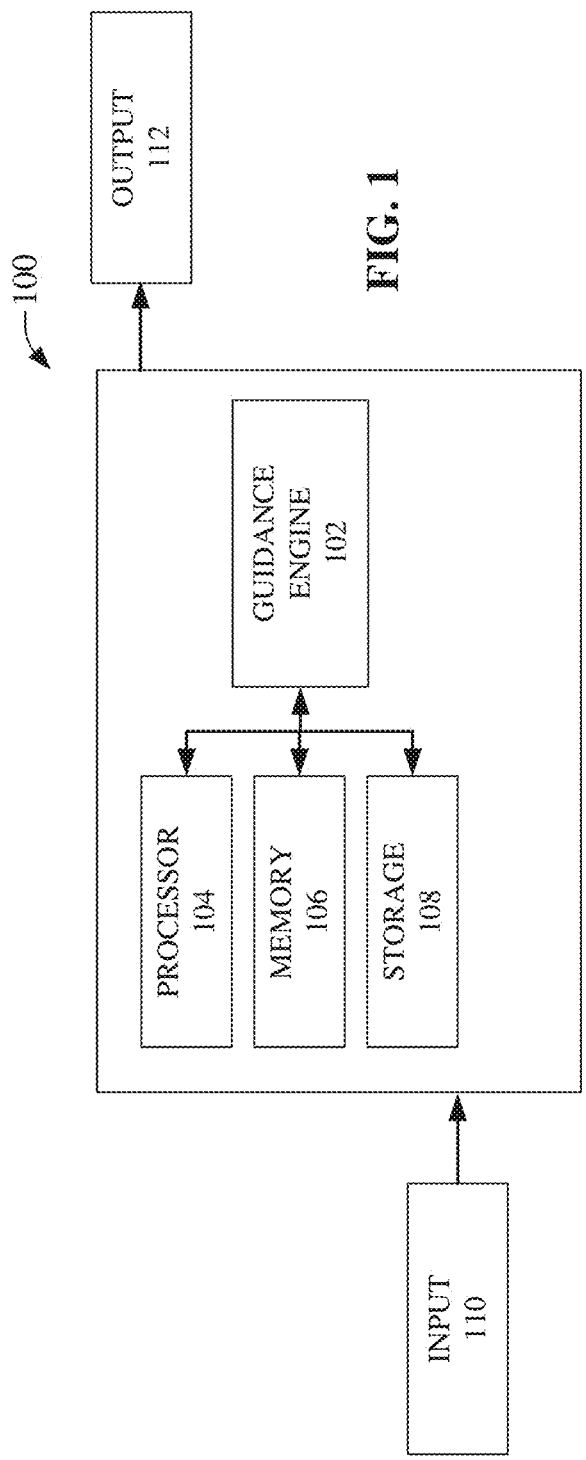
FIG. 1 is an illustration of a system that optimizes vehicular traffic flow, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter, in accordance with various embodiments, provides a system, apparatus, equipment, or device comprising: a processor, and a memory that stores executable instructions that, when executed by the processor, facilitate performance of operations. The operations can comprise generating a density map based on a key performance indicator value representing a number of connections between base station equipment and a group of user equipment located at a first geographical location, overlaying the density map over a roadway of a group of roadways associated with the first geographical location, determining, based on a width value associated with the roadway and a defined vehicular throughput value associated with the roadway, a limit on vehicular throughput for the group of roadways; and based on the limit on the vehicular throughput for the group of roadways, causing a listing of travel routes between the first geographical location and a second geographical location to be displayed on a user equipment.

In regard to the foregoing, the first geographical location can be supplied by the user equipment as a group of global positioning system coordinates, the second geographical location can be supplied by the user equipment as a character string representing a name of the second geographical location, the first geographical location can be a start location, and the second geographical location can be an end location. Further, the width value associated with the roadway can be determined based on a number of traffic lanes associated with the roadway, the defined vehicular throughput value can be determined as a function of a speed limit associated with the roadway, and where the user equipment is first user equipment, and where the group of user equipment comprises second user equipment traveling on the group of roadways.

Additional operations can include determining a group of global positioning system coordinates based on the character string, based on the character string, using a pattern matching process to verify the second geographical location.

In accordance with further embodiments, the subject disclosure describes methods and/or processes, comprising a series of acts that, for example, can include: receiving, by a device comprising a processor, a key performance indicator value representing a number of connections between networking equipment and a group of user equipment located in a first geographic area, based on the key performance indicator value, generating, by the device, a density map, overlaying, by the device, the density map over a group of roadways associated with the first geographic area, based on a width value associated with a roadway of the group of roadways and a defined vehicular throughput value associated with the roadway, determining, by the device, a maximum vehicular throughput for the group of roadways; and based on the maximum vehicular throughput, causing, by the device, an ordered list of travel routes between the first geographic area and a second geographic area to be displayed on a user equipment.

Additional acts can include receiving, by the device, the first geographic area as coordinate data associated with the first geographic area, comprising receiving, by the device, the second geographic area as coordinate data associated with the second geographic area, receiving, by the device, a third geographic area representing a geographic point along a route of travel between the first geographic area and the second geographic area, and determining, by the device, the maximum vehicular throughput for the group of roadways based on a demand penalty value associated with the roadway.

In accordance with still further embodiments, the subject disclosure describes machine readable media, computer readable storage devices, or non-transitory machine readable media comprising instructions that, in response to execution, cause a computing system (e.g., equipment, devices, groupings of devices, etc.) comprising at least one processor to perform operations. The operations can include: receiving from database equipment a key performance indicator value representing an aggregation of connections that exist between serving equipment situated in a first vicinity of a first area and a group of user equipment traveling through the first vicinity, based on the key performance indicator value, generating a density map for the first vicinity, overlaying the density map over a group of roadways associated with the first vicinity, based on a width value associated with a roadway of the group of roadways, a defined vehicular throughput value associated with the roadway, and a demand penalty value associated with the roadway, determining a an upper limit on vehicular throughput for the group of roadways, and based on the upper limit on vehicular throughput, causing a user equipment to display a ranked list of routes between the first vicinity and a second vicinity of a second area. Additional acts can include receiving, from the database equipment, a first network topology map representing first network equipment positioned within the first vicinity and a second network topology map representing second network equipment positioned within the second vicinity.

The subject disclosure, in example embodiments, describes leveraging network key performance indicator data from networking equipment such as serving equipment to determine live population density maps in order to optimize traffic patterns based on an end user's start location, destination, and other road settings not limited to tolls, shortest route by ground distance traveled, or quickest route. Based on these route parameters, one or more routes from the start location to the destination can be determined. The one or more routes can be determined by a process that aggregates network key performance indicator data between the start location and destination to determine population density of local geographical areas. The determine results can then be passed to route optimization process using Bernoulli's equation to maximize throughput across all roads. One the route optimization process has determined the one or more routes, these routes can be supplied to user equipment for the user to select the route on which they would prefer to travel. It should noted that in some embodiments the disclosed subject matter can be used to alleviate traffic by spreading traffic across different routes (e.g., highways, side streets, and other roads) based on current infrastructure throughput metrics. The one or more routes identified using the disclosed subject matter can be continually updated based on comparing new optimized predictions to a previous prediction.

FIG. 1 that illustrates a system 100 that optimizes vehicular traffic flow, in accordance with various embodiments. As illustrated, system 100 can be core network equipment or other networking equipment typically associated with one or more mobile network operator (MNO) entity. System 100 can comprise guidance engine 102 that can be in communication with processor 104 for facilitating operation of computer and/or machine executable instructions and/or components by guidance engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by guidance engine 102 to produce one or more useful, concrete, and tangible result, and/or transform one or more articles to different states or things. Further, system 100 can also generate and output the useful, concrete, and tangible results, and/or the transformed one or more articles produced by guidance engine 102, as output 112.

In some embodiments, system 100 can be Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to leverage key performance indicators (KPIs) from network equipment and population density maps to optimize traffic patterns based, for example, on an end user's start location, destination, other pertinent data, shortest route by ground distance traveled data, or quickest route to destination data. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

In some embodiments, system 100 can be central node global control equipment located on a MNO core network infrastructure. Examples of central node global control devices can comprise mobile edge compute (MEC) equipment, self organized network (SON) equipment, radio access network (RAN) intelligent controller (RIC) equipment, and/or similar equipment that can perform the functionalities and/or facilities described and/or disclosed herein.

Guidance engine 102, in some embodiments, can receive, as input 110, from user equipment (e.g., Smartphone equipment, cellular mobile equipment, notebook equipment, vehicle based mobile equipment, . . . ) satellite-based radio navigation system data relating start locations and destination locations that a user identity may wish to travel. For example, in certain embodiments the start and destination locations can be global positioning system (GPS) coordinate data. In other additional and/or alternative embodiments, the start and destination can be in the form of geo-location data (e.g., longitudinal coordinate data and latitudinal coordinate data. Other data that can be received via user input 110, can be data relating to points of interest that the user identity may which to visit while traversing from the start location to the destination. For example, a user identity may want to plot a journey from their house in city A to city B. However, prior to leaving their house in city A the user identity may wish to include a stop to refuel their vehicle, collect sundries (e.g., iced-tea, snacks, gifts, . . . ), identify points of interest along the route from city A and city B, ascertain the locations of rest stops along the journey, etc. Each of these additional "points of interest" can be input by the user identity by providing coordinate data, or in most probability by providing a generic identifier (e.g., gas station near my current location, shopping mall that contains a Drug Store, State or National Parks located along the putative route, . . . ). Additional data that can also be received via user input 110 can be data such as preferred routes; driving preferences (e.g., avoiding left turns at uncontrolled intersections [e.g., intersections without traffic lights or four-way stops, . . . ], avoiding intersections without traffic lights, avoiding intersections with traffic lights, etc.); information regarding notable dining establishments along the route that the user identity may wish to dine (e.g., suggested by guide books that award indicators of merit for excellence, determined by one or more artificial intelligence processes based on a user identity's past dining behaviors/preferences, etc.); and the like. Further data that can be obtained, via user input 110, can also include waypoints that the user identity may wish to arrive at within defined periods of time. For instance, the user identity may be a traveling salesman and may have scheduled a series of meetings with various client at particular times in disparately locations along the route between city A and city B.

Guidance engine 102 in response to receiving the aforementioned data inclusive of start locations and end locations, can parse the received or solicited data into constituent lexeme(s) (e.g., one word or several words, considered as an abstract unit, and applied to a family of words related by form or meaning) using a predetermined formal grammar. Guidance engine 102 based on parsing the input data can determine, for example, the start location geographical coordinates and the end location geographical coordinates. For instance, where guidance engine 102 receives the start location as a first string of text "1234 My Boulevard, Some City, Particular State," guidance engine 102 can use database equipment of groups of database equipment associated, for example, with MNO entities to determine the geographical coordinates for the entered first string of text, and thereafter obtain associated map data (e.g., maps that comprise topographical data, network topology data that illustrate the locations of various networking equipment (e.g., base station equipment, gNodeB equipment, eNodeB equipment, access point equipment, femtocell equipment, picocell equipment, internet of things (IoT) equipment, static user equipment [e.g., located within buildings, . . . ], user equipment in motion [e.g., associated with vehicular traffic], . . . ) related with the start locations, end destinations, and various location in between the start locations and the end destination. Similarly, where guidance engine 102 obtains the end location as a second string of text, guidance engine 102 can use the database equipment of groups of database equipment to identity the geographical coordinates for the entered second string of text and obtain associated map data linked with the end locations.

In some additional and/or alternative embodiments, guidance engine 102 can receive the start location and the end locations as strings of geographical coordinate data, in which case guidance engine 102 can verify whether or not the entered strings of geographical coordinate data correspond to valid start locations and/or valid end locations. Where guidance engine 102 is unable to ascertain that the geographical coordinate data correspond to valid start locations and/or valid end locations, guidance engine 102, using for example, artificial intelligence and/or machine learning processes, can identify closest matches to the entered start locations and/or end locations, and thereafter display (e.g., to a display device associated with user equipment) these identified closest matches for user identity confirmation.

In certain embodiments, guidance engine 102 can receive the start locations as a first sting of text and/or receive the end locations as a group of geographical coordinate string data. In this instance, guidance engine 102, as stated above, employ a database of database equipment to identity geographical coordinates associated with the first sting of text and use the database of database equipment or processes related to machine learning, artificial intelligence, and/or data analysis (e.g., data mining) to verify the entered group of geographical coordinate string data.

As will be understood by those skill in the art, a similar praxis, where applicable in regard to utilizing databases of databases and employing technologies related to machine learning, artificial intelligence, and/or data analysis, can be adopted in the context of the other data that can have been enter via user input 110. So for instance, where guidance engine 102 has received waypoint information, etc., guidance engine 102 can use information obtained from one or more databases, and technologies related to machine learning, artificial intelligence, and/or data analysis to obtain geographical coordinate data and associated map data related, for example to the received waypoint information.

In response to receiving map data, for instance, from one or more databases, related to the start location, end location, and/or waypoints between the start location and the end location, guidance engine 102 can further query one or more further database equipment for data related to key performance indicator (KPI) data associated with a location at issue. For instance, guidance engine 102 in the context of start location data can query one or more further database equipment in regards to KPI data associated with the start location. Examples of KPI data can comprise quality of service (QoS) metrics, numbers of connections (or aggregations of the number of connections) between network equipment (e.g., base station equipment, serving cell equipment, femtocell equipment, picocell equipment, networking IoT equipment, access point equipment, and the like) and one or more user equipment devices (e.g., user equipment devices that have previously been noted, and currently are observed, to be statically located (not in motion) in the vicinity of the start location, as well as user equipment devices that are currently noted be in transit through the vicinity of the start location) that can be located within a defined ambit of the start location. Additionally, KPI data can also comprise metrics related to connection aggregations in relation to various user equipment transitioning between network equipment (or particular or defined cell sectors controlled by various antennas associated with networking equipment) and/or inter network equipment connection aggregations (e.g., connections between first base station equipment, second base station equipment, third base station equipment, . . . ). Further, KPI data can comprise aggregations of reference signal received power (RSRP) measurement values, received signal strength indicator (RSSI) measurement values, signal to noise ratio (SNR) values, received signal code power (RSCP) values, signal to interference ratio (SIR) values, signal to interference plus noise ratio (SINR) values, distance measurement values, and the like as measured at various networking equipment and associated user equipment within defined areas (e.g., within the vicinity of the start location).

Guidance engine 102, based at least in part on the map data received, for instance, from one or more databases and associated with, for example, the start location, the end location, or information regarding one or more of the waypoints along a route between the start location and the end location; as well as KPI data that can have been obtained from database equipment associated, for example, with central node global control equipment, such as mobile edge computing (MEC) equipment, self organized network (SON) equipment, and/or radio access network intelligent controller (RIC) equipment, can generate contemporaneous density maps for the various location points at issue (e.g., start point, end point, and points that are situated in between the start point and end point). The generated density maps can provide indication as to the numbers of operational user equipment extant within a defined area at any moment of time. For instance, during the night (e.g., between 12:30 AM-4:30 AM) there can be an expectation that the numbers of operational user equipment will be low. Similarly, during holiday periods (e.g., weekends and/or statutory holidays) there can also be an expectation that the numbers of operational user equipment will be low, but nonetheless not necessarily as low as the numbers of operational user equipment that can be expected during normal nighttime periods. Further, during business hours (e.g., between 8 AM and 5 PM) or during special events (e.g., music concerts, political rallies, sporting events, scheduled road closures due to various department of transportation construction events, road closures due to traffic accidents, . . . ) there can be an expectation that the numbers of operational user equipment within a defined area will be substantially higher than the numbers of operational user equipment within the defined are during holiday periods and/or during normal nighttime periods.

Once guidance engine 102 has generated an appropriate density mask for the points at issue (e.g., start point, end point, intermediate points, . . . ) guidance engine 102 can overlay the generate density map over and current traffic maps (e.g., map reflective of currently active traffic flows associated with highways (motorways, autobahns), major roadways, secondary roadways, tertiary roadways, boulevards, avenues, streets, lanes, and the like, for the points at issue. The current active traffic flows can be obtained from various traffic cameras associated with national, state, or local highway departments. The relative traffic flows along the highways, major roadways, secondary roadways, tertiary roadways, boulevards, avenues, streets, lanes, etc. can be analyzed, for instance. using various pattern matching techniques and historical relative traffic flows for the points at issue and at for the time period at issue.

In response to overlaying the density map over the current traffic maps, guidance engine 102 can employ Bernoulli's equation, wherein roadways (e.g., highways, major roadways, secondary roadways, tertiary roadways, boulevards, avenues, streets, and the like) can be considered a collection of pipes of various disparate dimensions. For example, highways (motorways, autobahns) can be perceived as having larger pipe dimensions in relation to major roadways, major roadways can be perceived as having respectively larger pipe dimensions with respect to secondary and tertiary roadways, and secondary and tertiary roadways can be perceived as having respectively larger dimensions than boulevards, avenues, streets, lanes, pathways, and/or rural country lanes.

In the context of Bernoulli's equation:

$$P_1 + \tfrac{1}{2}\rho v_1 + \rho g h_1 = P_2 + \tfrac{1}{2}\rho v_2 + \rho g h_2$$

wherein $P_1$ and $P_2$ can represent pressures at input ends of pipes of defined dimension; $\rho$ can be a constant representative of a density of a fluid passing through the pipes; $v_1$ and $v_2$ can represent velocities of a fluid passing through the pipes; $h_1$ and $h_2$ can represent heights above a reference plane; and g can represent the gravitational acceleration exerted on the fluid passing through the pipes.

In regard to foregoing equation, the left side of the equation (e.g., $P_1 + \tfrac{1}{2}\rho v_1 + \rho g h_1$) can relate to a grouping of pipes of variable dimensions, whereas the right side (e.g., $P_2 + \tfrac{1}{2}\rho v_2 + \rho g h_2$) of the equation can related to a group of pipes with fixed dimensions.

As noted above, roadways, streets, etc. can be thought of as pipes in fluid dynamics. In the case of pipes, there can be a fixed limit on the maximum flow rate based on the diameter of the pipe and friction within the pipe. For streets/roadways there can be a "maximum flow rate of traffic" based on the number of lanes on the road (diameter) and the traffic pattern (friction). Thus, if a traffic problem is thought of as a fluid dynamics problem, each road can have a maximum throughput and the solution would be to optimize flow to be evenly distributed without exceeding maximum throughput.

Figure 5:
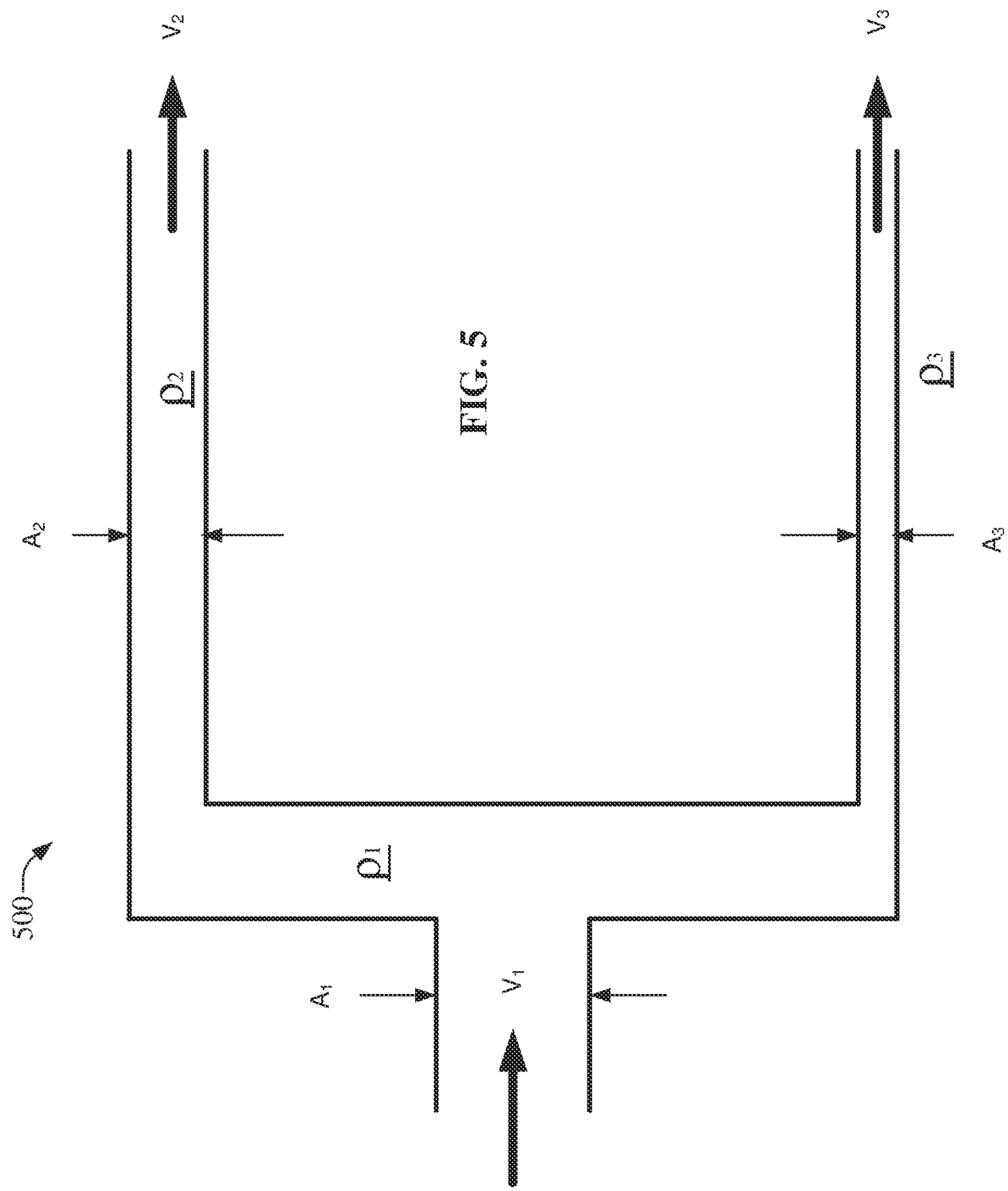
FIG. 5 provides depiction of a illustrative group of roads and highways, in accordance with aspects of the subject disclosure.

With reference to FIG. 5 therein is illustrated a system of streets 500. In some instances, the system of streets 500 can be referred to as a group of streets, a network of streets, a collection of streets, and the like. As depicted the system of streets 500 comprises a first roadway 502, a second roadway 504, and a third roadway 506. The first roadway 502 can be a major multi-lane roadway, such as a highway, motorway, or autobahn. The second roadway 504 can be secondary roadway, such as a major bi-directional thoroughfare in a city, such as state route, an avenue, or boulevard. In regard to second roadway 504 this can comprise one or more lanes in either direction. The third roadway 506 can be minor throughway such as a residential street, a country lane, or an unpaved path. In the context of third roadway 506 this can comprise a one-way street with at least one lane or a two-way street with at least one lane in either direction. As will be noted, there can be a hierarchy of roadways, wherein the first roadway 502 can have a greater number of lanes that the second roadway 504, which in turn can have a greater number of lanes that the third roadway 506. Further, in regard to the hierarchy of roadways, the first roadway 502 can be a highway which can have a markedly greater (e.g., faster speed limit) or no upper speed limit than the second roadway 504. The second roadway 504 can have a speed limit that can be lower than that of the first roadway 502, but a speed limit that is higher than that of the third roadway 506. Further, in some embodiments the third roadway 506 can have traffic calming features associated with it, such as vertical deflections (speed humps, speed tables, and raised intersections), horizontal shifts, traffic circles (e.g., roundabouts) and/or roadway narrowing in order to reduce speed and enhance the street environment for non-motorists. In regard to both second roadway 504 and/or third roadway 506, in some embodiments, use of features like closures that obstruct traffic movements in one or more directions, such as median barriers, can also be applied to reduce cut-through traffic. Typically, traffic calming measures can be implemented at an intersection, street, neighborhood, or area-wide level.

As depicted in FIG. 5 the system of streets 500 can be associated with respective theoretical maximum (or upper limit) throughput values (A), number of vehicles requesting access to road values (v), and demand penalty values ($\rho$). Thus, with regard to the first roadway 502 the theoretical maximum throughput value can be represented as $A_1$, and the number of vehicles requesting access to road value can be represented as $v_1$. In regard to second roadway 504, the theoretical maximum throughput value can be represented as $A_2$, and the number of vehicles requesting access to road value can be represented as $v_2$. With respect to third roadway 506, the theoretical maximum throughput value can be represented as $A_3$, and the number of vehicles requesting access to road value can be represented as $v_3$.

Returning to FIG. 1, guidance engine 102 can utilize Bernoulli's equation to maximize throughput across all roads, based on aggregated key performance indicators and the respective theoretical maximum throughput values (A), number of vehicles requesting access to road values (v), and demand penalty values (ρ) respectively associated with highways (motorways, autobahns), major roadways and secondary roadways, tertiary roadways, boulevards, avenues, streets, lanes, pathways, and/or rural country lanes between the start location and the end destination.

Thereafter, guidance engine 102 can determine one or more route to an end destination based on the results of the analysis using Bernoulli's equation. In some embodiments, where the analysis using Bernoulli's equation yields multiple possible equivalent routes to the end destination, guidance engine 102 can provide an ordering or ranking of the respective routes based, for instance, on one or more ranking rules, such as routes that are more proximate to route options and/or other user input data, such as shopping malls, rest areas, attractions, restaurants, and the like. Guidance engine 102 can thereafter return a list of optimal routes to user equipment for selection by a user identity.

Figure 2:
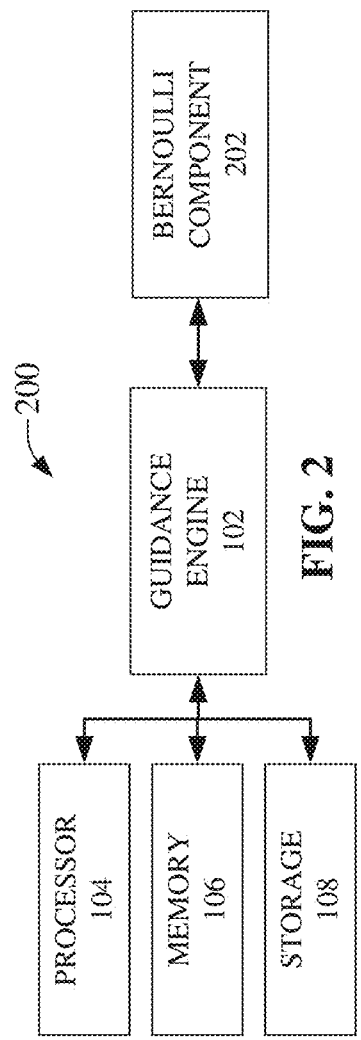
FIG. 2 provides illustration of an additional system that optimizes vehicular traffic flow, in accordance with aspects of the subject disclosure.

FIG. 2 provides further illustration of system 100, now referred to as system 200, that optimizes vehicular traffic flow, in accordance with various embodiments. As depicted system 200 can comprise guidance engine 102 that can operate in collaboration with Bernoulli component 202. Bernoulli component 202 can apply Bernoulli's equation to a system of roadways that can exist between a user input start location and an end destination in order to maximize throughput across all roads that can comprise the system of roadways. In various embodiments, Bernoulli component 202 can assign various values to each of the respective roads comprising the system of roadways. For instance, Bernoulli component 202 can associate first theoretical maximum throughput values, and first number of vehicles requesting access to road values to each respective highway, motorway, and/or autobahn. Bernoulli component 202 can also associate second theoretical maximum throughput values, and second number of vehicles requesting access to road values to each secondary roadway, tertiary roadway, boulevard, avenue, street, lane, pathway, and/or rural country lane that can exist between a start location and a end destination input by a user identity.

Figure 3:
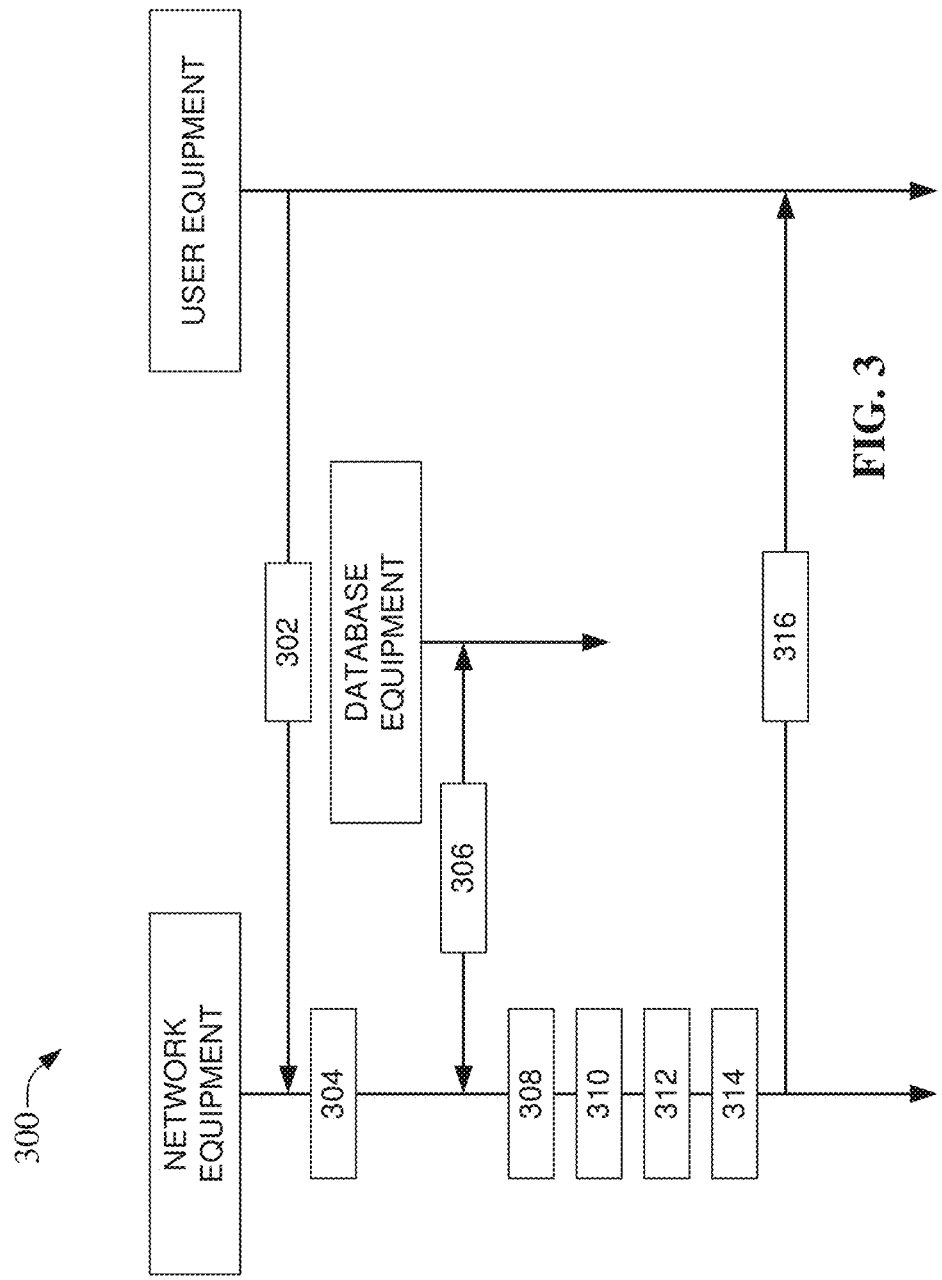
FIG. 3 provides illustration of a time sequence chart or method for optimizes vehicular traffic flow, in accordance with aspects of the subject disclosure.
Figure 4:
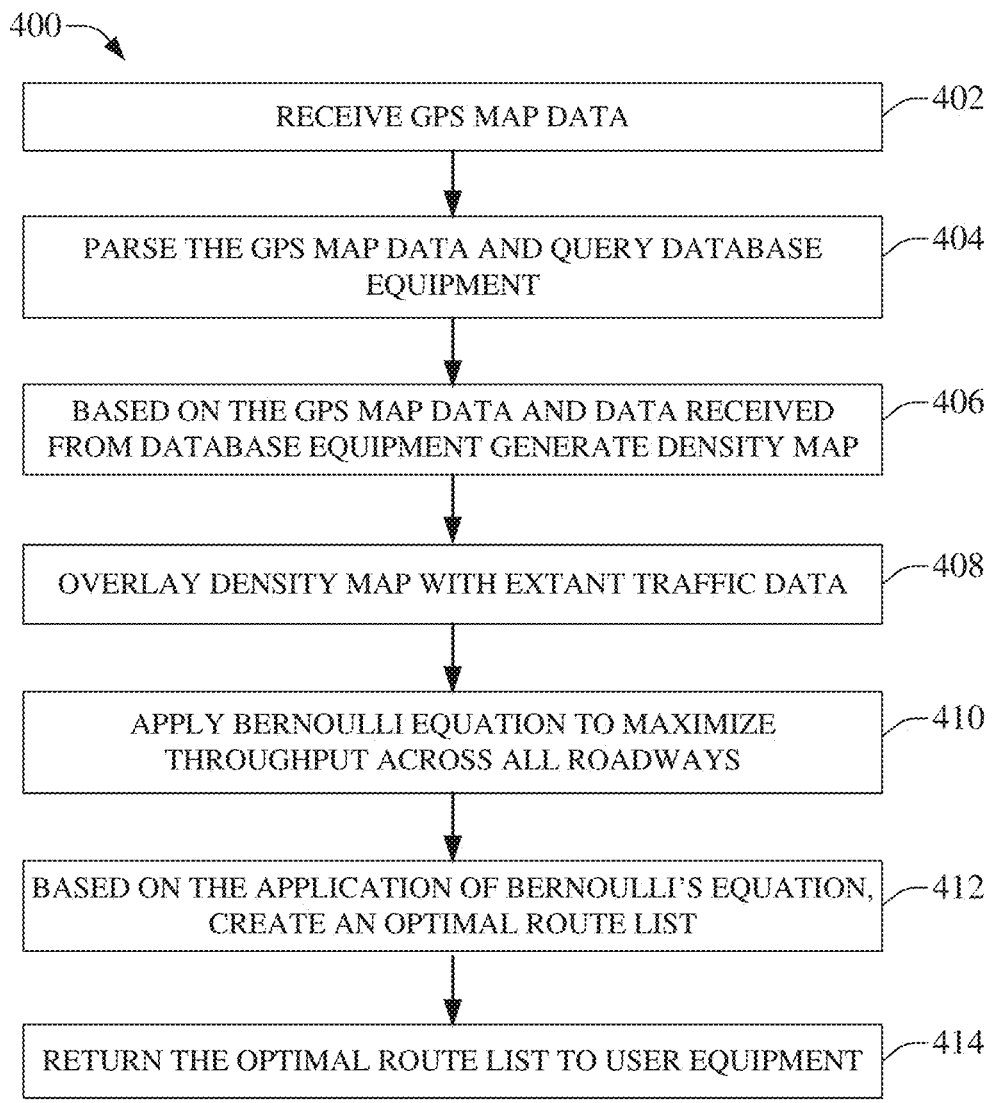
FIG. 4 provides illustration of another time sequence chart or method for optimizes vehicular traffic flow, in accordance with aspects of the subject disclosure.

In view of the example system(s) described above, example method(s) that can be implemented in accordance with the disclosed subject matter can be better appreciated with reference to the flowcharts and/or illustrative time sequence charts in FIGS. 3-4. For purposes of simplicity of explanation, an example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 3 provides depiction of a time sequence chart or method 300 that can be utilized to maximize vehicular traffic flow in accordance with various embodiments. At act 302 user equipment (UE) can send, and network equipment can receive, UE data comprising satellite-based road navigation system data relating to start locations and end locations that a user identity may wish to travel. Further at act 302 network equipment can also receive other data relating to points of interest that the user identity may wish to visit while traveling from the start location and the end locations. Also at act 302 network equipment can data pertaining to preferred route, driving preferences, information regarding notable dining establishments along the route, waypoint data representing groups of waypoints that the user identity may wish to arrive at within defined periods of time.

At act 304, in response to receiving UE data, network equipment can parse the received UE data into constitutes lexemes using one or more formal grammar. At act 304, based on the parsing of the UE data start location geographical coordinate data and/or the end destination geographical coordinate data can be determined.

At act 306, based on the start location geographical coordinate data and/or the end destination geographical coordinate data, one or more queries can be made to database equipment to retrieve database data. The database data can comprise KPI data representing QoS metrics, numbers of connections or aggregations of the number of connections between network equipment, such as base station equipment, serving cell equipment, femtocell equipment, picocell equipment, networking IoT equipment, and the like to be located in the vicinities of the start location geographical coordinates and/or the end destination geographical coordinates. Additionally and/or alternatively, the KPI data can also represent QoS metrics, numbers of connections or aggregations of the number of connections between network equipment situated in the vicinities of defined or identifiable areas along probable routes between the start location geographical coordinates and/or the end destination geographical coordinates. As has been noted earlier, KPI data can also include aggregations of RSRP measurement values, RSSI measurement values, SNR values, RSCP values, SIR values, distance measurement values between various networking equipment, and the like, as measured at various networking equipment and associated user equipment within the vicinities of the start location geographical coordinates, the end destination geographical coordinates, and in the vicinities of networking equipment located or situated at defined or identified areas along probable routes between the start location geographical coordinates and/or the end destination geographical coordinates.

Additionally and/or alternatively, at act 306 database data can also include map data comprising geographic topographical map data, road map data, network topology map data that depict the geographical topography, roads, and/or networking topology of various networking equipment related with the start and/or end locations, as well as intermediate locations along one or more routes that can extend from the start locations to the end destinations.

At act 308, based on the database data and the received user identity input data relating to start and end coordinates, etc., density maps can be generated for the start and/or end locations, as well as the various intermediate location along the one or more routes between the start locations and the end locations. It should be noted that the generated density maps can be variable over time, and can be variable depending on time. For instance, a density map generated at midnight of a weeknight will typically differ markedly from a density map generated during "rush hour" of a weekday. Similarly, a density map generated on a Friday afternoon, prior to a long weekend, can be much different from a density map generated on a Friday that does not precede the long weekend. Further, a density map generate during evacuation events such as due to natural disasters (hurricanes, tornados, earthquakes, snow events, etc.), and special events (political rallies, music concerts, sporting events, etc.) can also be atypical from density maps representative of "normal" conditions. Additionally it should also be noted that generated density maps can vary over time due to extenuating circumstances, such as traffic accidents, temporary road blockages and closures, and the like.

At act 310 the generated density maps can be overlaid with extant traffic data. Extant traffic data can be obtained from traffic cameras that can have been positioned along highways, roadways, etc., by governmental organizations (e.g., state or local motor bureaus). At act 312, to the extant traffic data and generated density maps Bernoulli's equation can be applied in order to maximize the throughput of vehicular traffic across all roadways between the start location and the end destination. At act 314, using the results of Bernoulli's equation that maximizes the throughput of vehicular traffic across all roadways between the start location and the end destination, taking into account the one or more preferences that a user identity can also have supplied when entering the start location and the end destination points, an optimal route list can be generated. It should be noted in regard to the generated optimal route list that this list can be dynamic for the duration of the journey from the start location and the end destination point; the optimal route list can change during the journey to take into account changing situations with regard to road conditions, traffic conditions, changes in weather, changes supplied via user input, and the like.

At act 316 the generated optimal route list can be returned to user equipment for display and for a user identity to select a desired route from the list of optimal routes.

FIG. 4 a flow chart or method 400 for maximizing vehicular traffic flow in accordance with various embodiments. Method 400 can commence at act 402 wherein network equipment can receive user identity supplied UE data representing at least start location GPS map data and/or end destination GPS map data. At act 404 the start location GPS map data and/or end destination GPS map data can be parsed into one or more lexemes. The lexemes can then be used to generate one or more database queries that can be directed to and forwarded to database equipment (e.g., a database of groups of databases). At act 406 based on at least the start location GPS map data and/or the end destination GPS map data (and any user identity supplied intermediate points of interest between the start location and/or the end destination) and database data returned by database equipment in response to the one or more database queries, density maps can be generated. At act 408 the density maps can be overlaid with traffic data that can represent traffic conditions currently being experienced in the vicinities areas of the start location and/or end destination, as well as in the vicinities at defined or definable locations along the route(s) between start location and the end destination. In regard to the defined or definable locations along the route(s) between the start location and the end destination, these locations can be identified based on the relative concentrations or densities of network equipment within the locations at issue. At act 410 Bernoulli's equation can be applied to maximize the throughput of vehicular traffic across all roadways along the route(s) between the input start location and/or the input end destination, after which at act 412 lists of optimal route listings can be generated and thereafter returned to user equipment for subsequent display at act 414.

Figure 6:
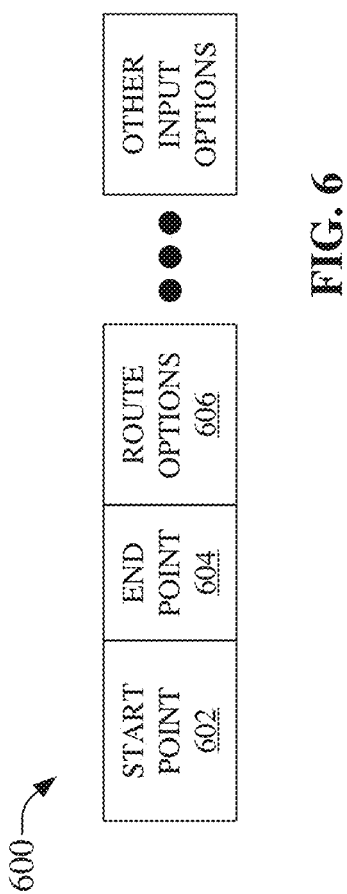
FIG. 6 illustrates an example user identity input record, in accordance with aspects of the subject disclosure.

FIG. 6 provides illustration of an user identity input record 600 in accordance with various embodiments. User identity input record 600 can be a record of records comprising at least start location data 602 and end destination data 604 that a user identity may wish to travel. Additionally, the user identity input record 600 can also comprise route option data 606 such as data relating to points of interest that the user identity may which to visit while traversing from the start location to the end destination; preferred routes; driving preferences (e.g., avoiding left turns at uncontrolled intersections, avoiding intersections without traffic lights, avoiding intersections with traffic lights, etc.); information regarding notable dining establishments along the route that the user identity may wish to dine; and the like. Further information that can comprise route option data 606 can include waypoint data related to waypoints that the user identity may wish to arrive at within defined periods of time. For instance, the user identity may wish to reach a particular intermediary point along the route between the start location and the end destination at a defined time or within a defined range of times (e.g., within 10 minutes prior to a scheduled meeting).

Figure 7:
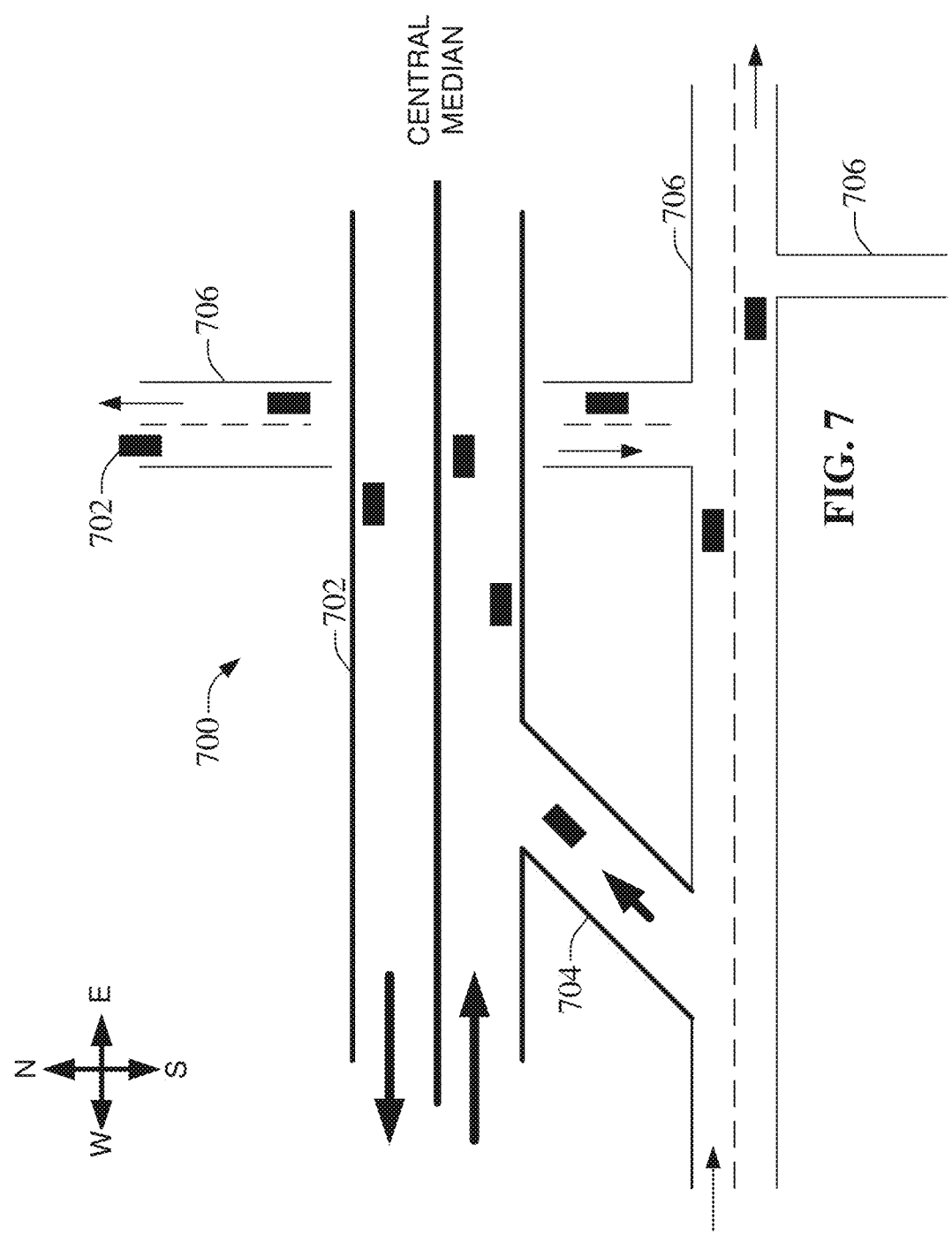
FIG. 7 provides illustration of a system of roadways that have been optimized based on an application of Bernoulli's equation, in accordance with aspects of the subject disclosure.

FIG. 7 depicts a grouping of roadways 700 that have been optimized based on an application of Bernoulli's equation, in accordance with various embodiments. As illustrated the group of roadways can comprise a first roadway 702, an on-ramp 704 to the first roadway 702, and secondary and tertiary roads 706 of disparate widths (and differing speed limits) and varying defined vehicular throughputs. As further illustrated in FIG. 8, the one or more vehicles 708 represented as colored rectangles are evenly dispersed along each of the first roadway 702, the on-ramp 704, and the secondary and tertiary roads 706; there does not appear to be congestion on first roadway 702, the on-ramp 704, and the secondary and tertiary roads 706.

Figure 8:
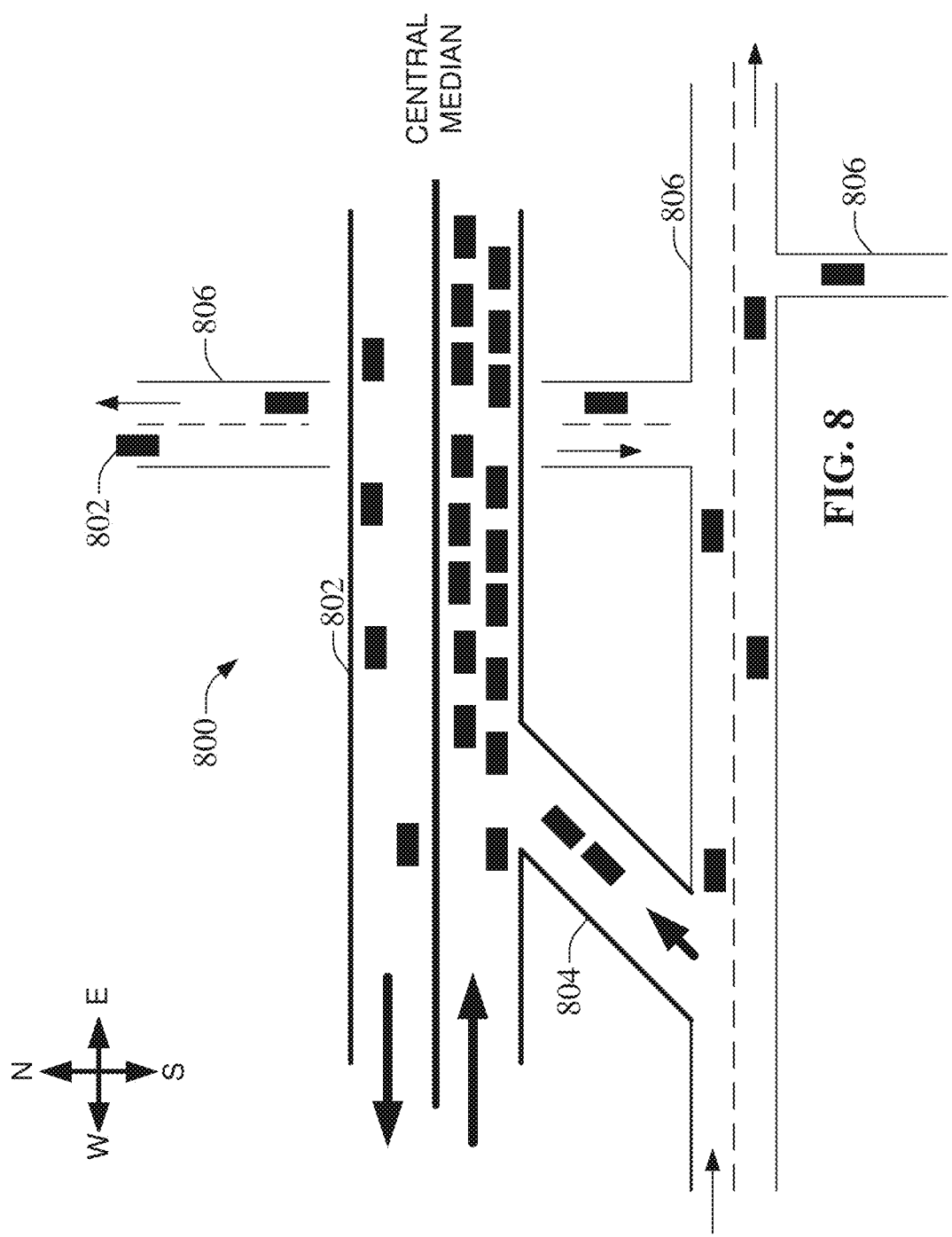
FIG. 8 provides illustration of a system of roadways prior to being optimized based on an application of Bernoulli's equation, in accordance with aspects of the subject disclosure.

In contrast FIG. 8 illustrates a collection of roadways 800 prior to being optimized based on an application of Bernoulli's equation, in accordance with aspects of the subject disclosure. Here it will be observed that the first roadway, now labeled 802, and on-ramp, now labeled 804, have significant congestion while the secondary and tertiary roads, now labeled 806 are relatively traffic free. In this circumstance, by applying Bernoulli's equation of the collection of roadways 800, a vehicle (e.g., 802) traveling along first roadway 802 can be directed to use an off-ramp to the secondary and tertiary roads 806 in order to avoid the congestion along the first roadway 802 and to reach a determined end destination with minimal loss of time.

Figure 9:
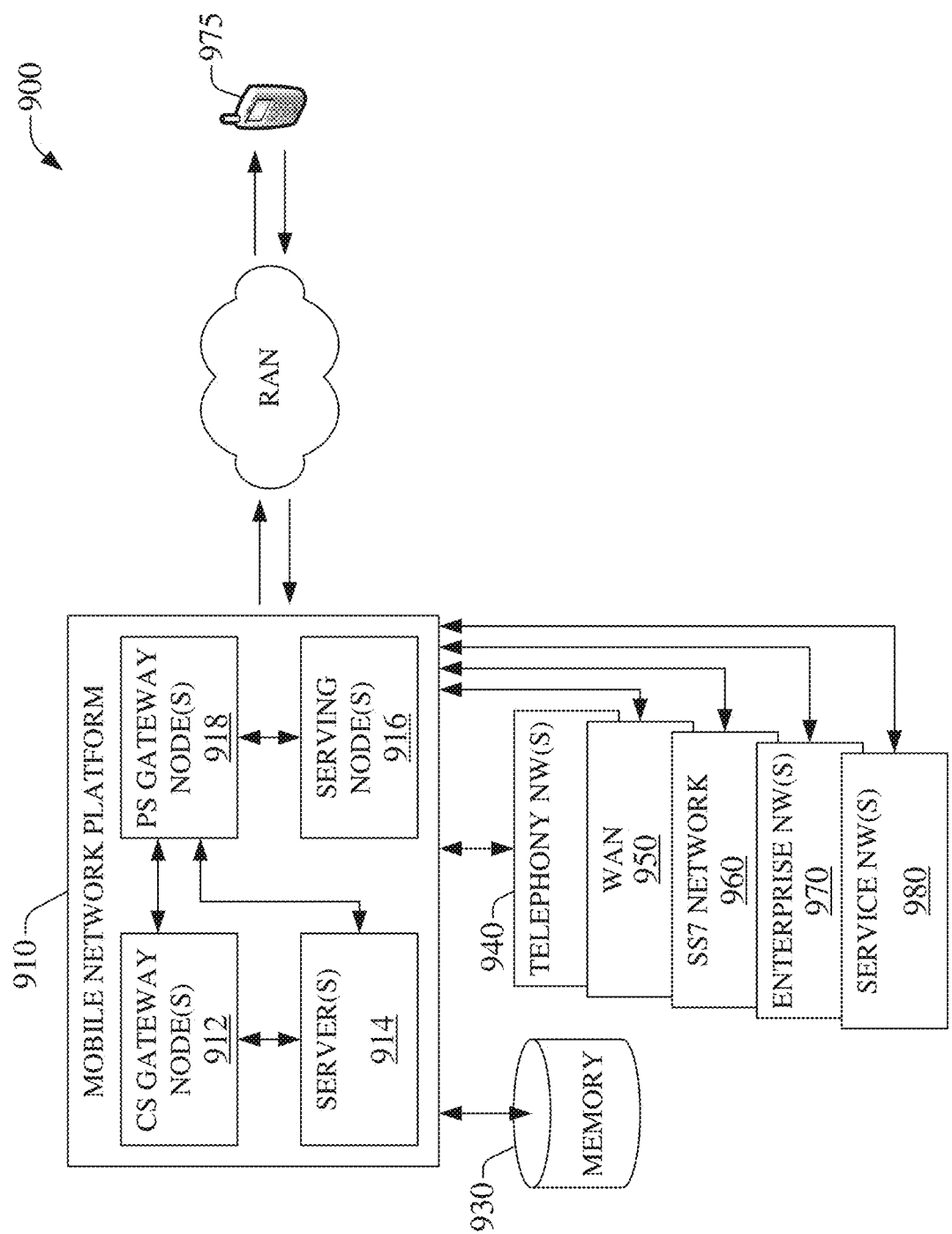
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
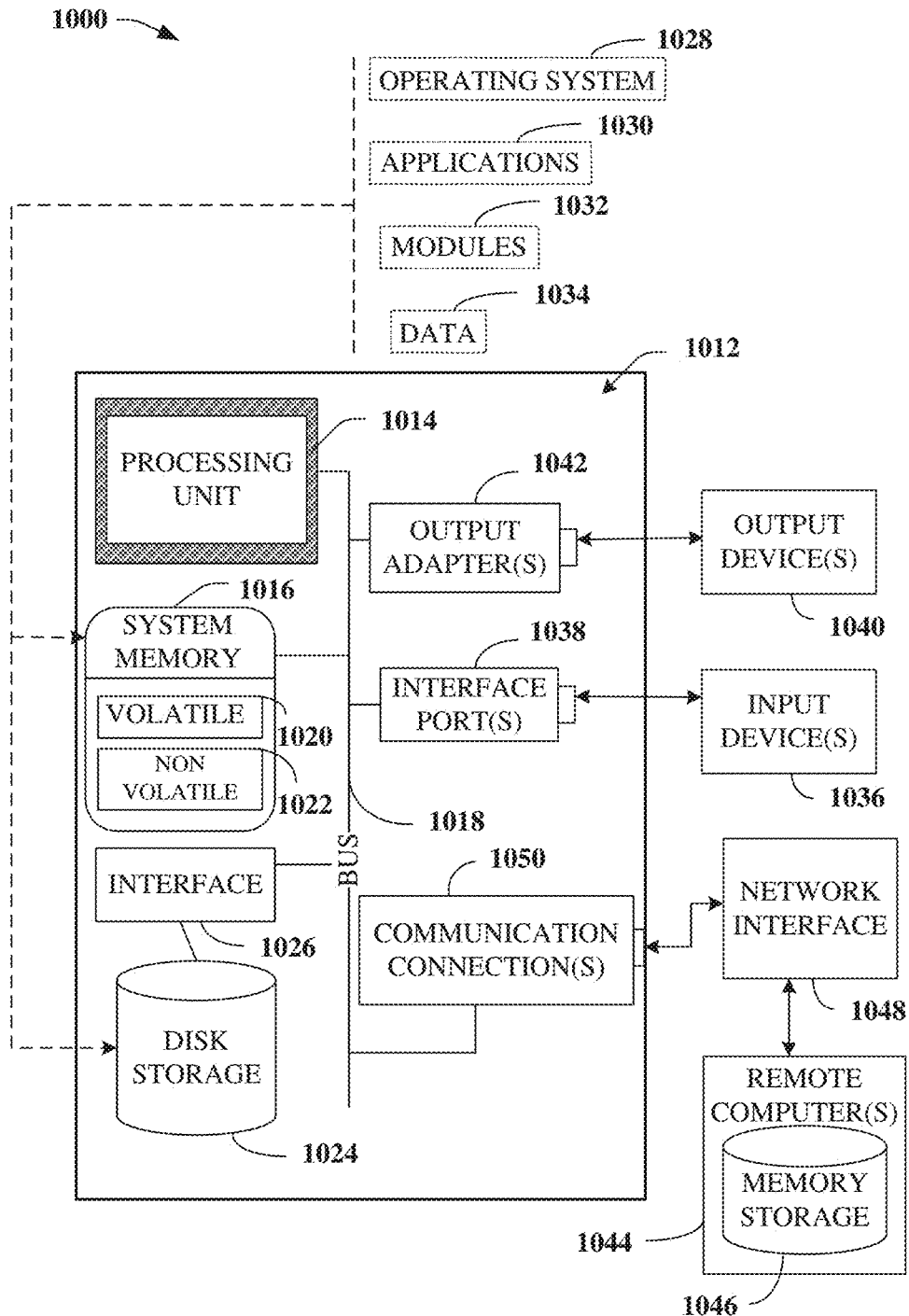
FIG. 10 illustrates a block diagram of a computing system operable to execute the disclosed example embodiments.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute one or more parts of one or more of the disclosed example embodiments. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCMCIA), Firewire (IEEE 1094), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g.,call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g.,PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of embodiments illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Vehicle based mobile equipment, comprising:
a processor; and
a memory that stores instructions that, when executed by the processor, facilitates performance of operations, comprising:
receiving, from a user operating a user interface, a first character string defining a start location;
receiving, from the user operating the user interface, a second character string defining a destination;
providing the first character string and the second character string to a machine learning process to verify the first character string and the second character string;
receiving, from the machine learning process, a first closest match to the first character string and a second closes match to the second character string;
presenting, to the user at the user interface, the first close match as a possible start location and the second closest match as a possible destination;
receiving, from the user operating the user interface, a confirmation accepting the possible start location as the start location and accepting the possible destination as the destination;
generating a density map based on a communication network key performance indicator value representing information about communication traffic between base station equipment of a mobile network operator (MNO) entity operating a mobile communications network in a mobile network service area and a group of user equipment operating on the mobile communications network and located at a first geographical location, wherein the first geographical location is located in the mobile network service area;
overlaying the density map over a current traffic map for a roadway of a group of roadways associated with the first geographical location, wherein the current traffic map reflects currently active vehicular traffic flows associated with the group of roadways;
based on a width value associated with the roadway of the group of roadways and a defined vehicular throughput value associated with the roadway of the group of roadways, determining a limit on vehicular throughput for the group of roadways;
based on the limit on vehicular throughput for the group of roadways, selecting a set of travel routes for vehicular traffic through the group of roadways to maximize throughput of vehicular traffic across all roadways of the group of roadways, the set of travel routes to guide a vehicle from the start location to the destination;
causing a listing of travel routes of the set of travel routes between the start location and the destination to be displayed on the user interface of the vehicle based mobile equipment, wherein the destination is located in the mobile network service area;
receiving updated communication network key performance indicator information about the communication traffic between the base station equipment of the MNO entity and the group of user equipment, the updated communication network key performance indicator information reflective of changed vehicular traffic conditions;
generating a revised density map based on the updated communication network key performance indicator information; and
periodically updating the set of travel routes based on the revised density map to continuously maximize throughput of the vehicular traffic across all roadways of the group of roadways.

2. The vehicle based mobile equipment of claim 1, wherein the operations further comprise:
receiving, from the user operating the user interface, a set of user preferences,
wherein the selecting the set of travel routes comprises determining, by an artificial intelligence process, selected travel routes that conform to the set of user preferences.

3. The vehicle based mobile equipment of claim 1, operations further comprise:
receiving, from the user operating the user interface, a selection of a preferred route over which to travel from the start location to the destination.

4. The vehicle based mobile equipment of claim 3, wherein the operations further comprise determining a group of global positioning system coordinates based on the first character string and the second character string.

5. The vehicle based mobile equipment of claim 3, wherein the operations further comprise, based on the second character string, using a pattern matching process to verify the destination.

6. The vehicle based mobile equipment of claim 1, wherein the first geographical location corresponds to the start location.

7. The vehicle based mobile equipment of claim 1, further comprising determining global positioning system coordinates based on the destination.

8. The vehicle based mobile equipment of claim 1, wherein the roadway of the group of roadways is a first roadway, wherein the width value is a first width value, wherein the defined vehicular throughput value is a first defined vehicular throughput value, wherein the group of roadways comprises a second roadway associated with a second width value and a second defined vehicular throughput value associated with the second roadway, and wherein the first width value is greater than the second width value and the first defined vehicular throughput value is greater than the second defined vehicular throughput value.

9. The vehicle based mobile equipment of claim 1, wherein the width value associated with the roadway of the group of roadways is determined based on a number of traffic lanes associated with the roadway of the group of roadways.

10. The vehicle based mobile equipment of claim 1, wherein the defined vehicular throughput value is determined as a function of a speed limit associated with the roadway of the group of roadways.

11. The vehicle based mobile equipment of claim 1, wherein the operations further comprise verifying, in a machine learning process, the second character string defining the destination.

12. A method, comprising:
receiving, by a device comprising a processor, a communication network key performance indicator value representing information about communication traffic between network equipment of a mobile network operator (MNO) entity operating a mobile communications network and a group of user equipment operating on the mobile communications network and located in a first geographic area;
receiving, by the device, from a user operating a user interface, a first character string defining a start location;

receiving, by the device, from the user operating the user interface, a second character string defining a destination;

providing, by the device, the first character string and the second character string to a machine learning process to verify the first character string and the second character string;

based on the communication network key performance indicator value, generating, by the device, a density map;

overlaying, by the device, the density map over a current traffic map for a group of roadways associated with the first geographic area, wherein the current traffic map reflects currently active traffic flows associated with the group of roadways;

based on a width value associated with a roadway of the group of roadways and a defined vehicular throughput value associated with the roadway of the group of roadways, determining, by the device, a maximum vehicular throughput for the group of roadways;

based on the maximum vehicular throughput, selecting a set of travel routes for vehicular traffic through the group of roadways to maximize throughput of vehicular traffic across all roadways of the group of roadways, the set of travel routes to guide a vehicle from the start location to the destination;

causing, by the device, an ordered list of travel routes of the set of travel routes between the first geographic area and the destination to be displayed on a user equipment of the group of user equipment;

receiving updated communication network key performance indicator values reflective of changed traffic conditions on one or more roadways of the group of roadways;

generating a revised density map based on the updated communication network key performance indicator values; and periodically updating the set of travel routes based on the revised density map.

13. The method of claim 12, further comprising receiving, by the device, from the user operating the user interface, the first geographic area as coordinate data associated with the first geographic area.

14. The method of claim 12, further comprising receiving, by the device, from the user operating the user interface, information defining the destination as coordinate data associated with the destination.

15. The method of claim 12, further comprising:
receiving, by the device, from the user operating the user interface, a third geographic area representing a geographic point along a route of travel between the start location and the destination; and selecting, by the device implementing an artificial intelligence process, travel routes that guide the vehicle from the start location to the destination via the third geographic area.

16. The method of claim 12, further comprising determining, by the device, the maximum vehicular throughput for the group of roadways based on a demand penalty value (p) associated with the roadway of the group of roadways.

17. A non-transitory machine-readable medium, comprising executable instructions that, when executed by a processor, facilitate performance of operations, comprising:
receiving, from a user operating a user interface, a first character string defining a start location;
receiving, from the user operating the user interface, a second character string defining a destination;

providing the first character string and the second character string to a machine learning process to verify the first character string and the second character string;

presenting, to the user at the user interface, a first closest match as a possible start location and a second closest match as a possible destination;

receiving, from the user operating the user interface, a confirmation accepting the possible start location as the start location and accepting the possible destination as the destination;

receiving from database equipment a communication network key performance indicator value representing an aggregation of communication traffic between serving equipment situated in a first vicinity of a first area and a group of user equipment travelling through the first vicinity, wherein the serving equipment comprises communications equipment of a mobile network operator (MNO) entity, the MNO entity operating a mobile communications network in the first area, wherein the user equipment comprises equipment operating on the mobile communications network;

based on the communication network key performance indicator value, generating a density map for the first vicinity;

overlaying the density map over a current traffic map for a group of roadways associated with the first vicinity, wherein the current traffic map reflects currently active traffic flows associated with the group of roadways;

based on a width value associated with a roadway of the group of roadways, a defined vehicular throughput value associated with the roadway of the group of roadways, and a demand penalty value (p) associated with the roadway of the group of roadways, determining an upper limit on vehicular throughput for the group of roadways;

based on the upper limit on vehicular throughput, selecting a set of travel routes for vehicular traffic through the group of roadways to maximize throughput of vehicular traffic across all roadways of the group of roadways, the set of travel routes to guide a vehicle from the start location to second location;

causing a user equipment to display a ranked list of routes of the set of travel routes between the start location and the destination in a second area;

receiving an updated communication network key performance indicator value reflective of changed traffic conditions;

generating a revised density map based on the updated communication network key performance indicator value; and periodically updating the set of travel routes based on the revised density map.

18. The non-transitory machine-readable medium of claim 17, wherein the start location is a geographic origination point and the destination is a geographic end point.

19. The non-transitory machine-readable medium of claim 17, wherein the first area, the second area, the roadway of the group of roadways, and a user preference associated with the roadway of the group of roadways are received, as input, from the user operating the user interface.

20. The non-transitory machine-readable medium of claim 17, wherein the operations further comprise receiving, for the database equipment, a first network topology map representing first network equipment positioned within the first vicinity and a second network topology map representing second network equipment positioned at the destination.

\* \* \* \* \*